United States Patent [19]

Weikmann

[11] Patent Number: 4,867,798
[45] Date of Patent: Sep. 19, 1989

[54] METHOD OF AND INSTALLATION FOR CLEANING MOTOR VEHICLES

[76] Inventor: Guenther Weikmann, Ulmer Strasse 19, D-7918 Illertissen, Fed. Rep. of Germany

[21] Appl. No.: 65,869

[22] Filed: Jun. 24, 1987

[30] Foreign Application Priority Data

Jun. 24, 1986 [CH] Switzerland .................. 01797/86

[51] Int. Cl.$^4$ ............................................. B08B 7/00
[52] U.S. Cl. .......................................... 134/6; 134/9; 134/25.1; 134/25.4; 134/123; 15/53 A; 15/21 R; 15/DIG. 2
[58] Field of Search ................ 134/6, 9, 45, 25.4, 134/172, 25.1, 57 R, 123; 15/DIG. 2, 53 AB, 21 R

[56] References Cited

U.S. PATENT DOCUMENTS

| 1,613,213 | 1/1927 | Wilde et al. ............... 15/DIG. 2 |
| 1,827,886 | 10/1931 | Gillespie .................. 15/DIG. 2 |
| 2,788,009 | 4/1957 | Lones ........................ 134/72 |
| 3,037,224 | 6/1962 | Webster ................... 15/DIG. 2 |
| 3,167,787 | 2/1965 | Hergonson ............... 15/DIG. 2 |
| 3,263,341 | 8/1966 | Allen ........................ 15/DIG. 2 |
| 3,451,085 | 6/1969 | Hay ........................... 15/DIG. 2 |
| 3,685,079 | 8/1972 | Dawson .................... 15/DIG. 2 |
| 4,135,533 | 1/1979 | Gall et al. ................ 15/DIG. 2 |
| 4,239,551 | 12/1980 | Smith ....................... 15/DIG. 2 |
| 4,303,087 | 12/1981 | Flaxman .................... 134/58 |
| 4,654,087 | 3/1987 | Fujita et al. .............. 134/25.4 |

FOREIGN PATENT DOCUMENTS

| 902273 | 8/1985 | Belgium ................... 15/DIG. 2 |
| 0162709 | 5/1985 | European Pat. Off. .... 15/DIG. 2 |
| 0144473 | 6/1985 | European Pat. Off. .... 15/DIG. 2 |
| 450586 | 7/1927 | Fed. Rep. of Germany . |
| 1007196 | 4/1957 | Fed. Rep. of Germany ... 15/DIG. 2 |
| 1430467 | 2/1969 | Fed. Rep. of Germany . |
| 1530939 | 8/1969 | Fed. Rep. of Germany ... 15/DIG. 2 |
| 1780425 | 2/1972 | Fed. Rep. of Germany ... 15/DIG. 2 |
| 2822046 | 11/1979 | Fed. Rep. of Germany ... 15/DIG. 2 |
| 3242524 | 10/1984 | Fed. Rep. of Germany . |
| 624584 | 7/1927 | France ...................... 15/DIG. 2 |
| 847082 | 10/1939 | France ...................... 15/DIG. 2 |
| 2044344 | 2/1971 | France ...................... 15/DIG. 2 |
| 2133382 | 10/1972 | France ...................... 15/DIG. 2 |
| 58-93654 | 6/1983 | Japan ........................ 15/DIG. 2 |
| 2100024 | 12/1982 | United Kingdom ...... 15/DIG. 2 |

Primary Examiner—Asok Pal
Attorney, Agent, or Firm—Dickstein, Shapiro & Morin

[57] ABSTRACT

A method of wet-cleaning and drying and/or visual inspection, servicing and repair of automobiles in which cleaning liquids are applied to the vehicle by manually operated means and wherein the vehicle is moved by foreign power past an operator's stand in such a manner that all lateral surfaces of the vehicle successively come to face said stand. Similar operations are carried out at the same time to the underfloor and/or the roof of the vehicle. An installation for carrying out the method in a roofed treatment room which comprises means for supplying cleaning liquids required for the treatment of the automobiles and is characterized by a platform rotatably disposed in the floor of the treatment room. Multi-appliances sets serve to supply several cleaning liquids of different nature independently of each other. One set is disposed on an operator's stand in the stationary floor region of the treatment room, below the rotatable platform, and on the roof framework of the treatment room.

28 Claims, 7 Drawing Sheets

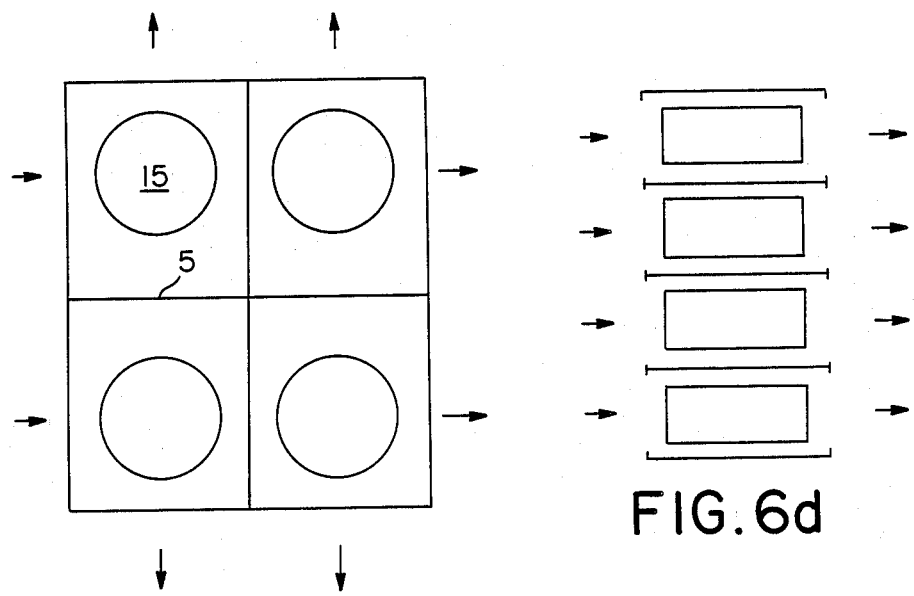
FIG.6c
FIG.6d
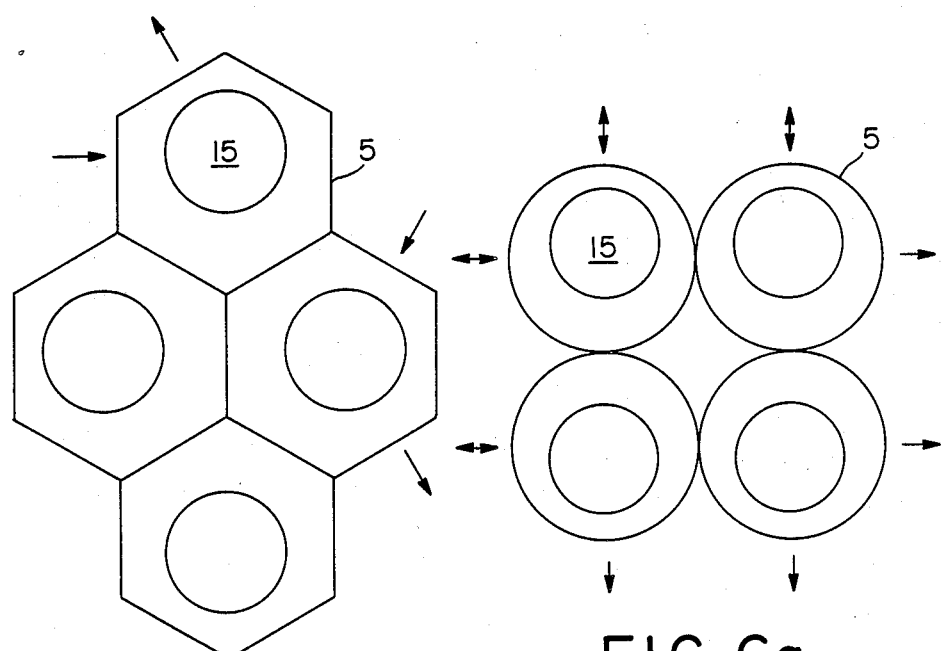
FIG.6b
FIG.6a

METHOD OF AND INSTALLATION FOR CLEANING MOTOR VEHICLES

The invention relates to a method of wet-cleaning and drying and/or visual inspection, servicing and repair of motor vehicles, in particular of motor vehicles having more than two wheels, in which the supply of cleaning liquids to the vehicle, with the exception of the underfloor thereof, is effected substantially with the aid of manually operated means.

In known self-service washing installations in almost exclusively rectangular washing boxes, the motor vehicle to be cleaned, which rests at a standstill, must be hosed down all around with the aid of a long hose or, respectively, with the aid of the spraying or washing gun attached thereto. In doing so, the operator possibly has to surround the standing vehicle several times. This task which is already tiresome and time-consuming per se is frequently delayed additionally by projecting parts of the vehicle, such as mirrors, windshield wipers etc., as well as by equipment such as luggage or ski racks etc. These must therefore frequently be removed before the cleaning procedure and must be mounted again after the cleaning operation. An additional considerable inconvenience in this respect resides in the cleaning of the roof and the underfloor of the vehicle although some of the more recent known installations already include a spraying head for underfloor washing in a bottom opening.

As the duration of the troublesome washing operation increases, there is of course also an increase in the consumption of clean water as well as an increase in the resulting quantity of waste water.

If the effect of the water jet and the cleaning liquids is not sufficient for removing firmly adhering dirt from the vehicle, present-day self-washing installations do mostly not yet offer an effective mechanical auxiliary means, but at the most make available a relatively small and weak brush that can be attached to the nose piece of the hose.

In view of the required considerable length and the thus caused inconvenience in handling of the hose during the washing operation, it is thus possible only to use one single hose. All cleaning liquids provided for use and supplied by one single pump must be fed through said single hose to the vehicle to be cleaned. Thus, the pump and the hose must be designed for the greatest feed pressure required and for the greatest feed quantity required. Thus, a thick-walled heavy hose is necessary. Besides, unless an expensive control pump is employed, the adaptation of a simple conveyor pump to the maximum data for pressure and capacity leads to a waste of cleaning liquids.

The requirement for time and cleaning liquids is increased additionally in this simple arrangement by the fact that, when one changes from one cleaning liquid to another one, one must wait first until the remainder of the cleaning liquid used first, which is still present in the hose, has been used completely before the delivery of that liquid only starts that is required as the second cleaning liquid. During said transition period, actually a mixture of both liquids is delivered in that the concentration of the two liquids changes in uncontrollable manner from saturation with the first liquid to saturation with the second liquid.

The thick, long and heavy hose requires much space. It cannot be wound onto a reel and thus is difficult to manipulate by hand. Besides, in winter times there is an increased risk of freezing of the long hose.

It is the object of the invention to indicate a method by means of which the above disadvantages of known installations of the type indicated at the outset can be avoided or at least be reduced considerably. By simplification, rationalization and acceleration of the treatment processes, the invention particularly aims at increasing the efficiency, the turnover and thus the profitability of installations of the type concerned.

The method according to the invention is characterized by the measures indicated in patent claim 1.

Due to the in situ rotation of the vehicle, the operator can remain on or at least near the operator's stand during the treatment process. The operator can save himself the trouble of having to drag a long, heavy hose all around the vehicle. This easing simplification along with the simultaneously occuring operations on the roof and the underfloor of the vehicle permit, in comparison with the conventional method, a considerable gain of time and thus an increase of the turnover. The profitability of the installation rises.

Measures for the advantageous further development of the method can be taken from dependent patent claims 2 to 7.

An additional subject matter of the invention is an installation for carrying out the method according to claims 1 to 7.

In comparison with known means of similar type, the installation of the invention is to be designed such that it provides a certain mobility with respect to the site of erection while requiring less space and less investment expenditure, and such that it displays at the same time high adaptability to the local conditions as well as universality with respect to the vehicles to be treated and, furthermore, such that it ensures an economically optimum use of cleaning liquids while the treatment time is shortened simultaneously.

For meeting the object indicated, an installation according to the type of device concerned is provided having the features according to the characterizing part of claim 8.

The simplifying and accelerating rationalization effect of the rotatable platform is additionally enhanced by the provision of multi-appliance or multi-utensil sets. This renders possible especially a further reduction of the treatment time or passage time of the vehicles through the installation. Apart from the fact that the vehicle can be treated at the same time not only on its lateral surfaces but also on its underfloor and its roof, during which a rapid selective supply of the cleaning liquids or agents is ensured, the achievement of the aims strived at includes also further advantages of great significance which have become possible only by the use of the rotary platform according to the invention and which will have to be elucidated in detail hereinafter.

Features of a particularly expedient further development of the installation according to the invention are subject matter of the dependent patent claims 9 to 36.

BRIEF DESCRIPTION OF DRAWINGS

The invention will be elucidated in more detail by way of example on the basis of a preferred embodiment with reference to the drawings in which.

Figure 1:
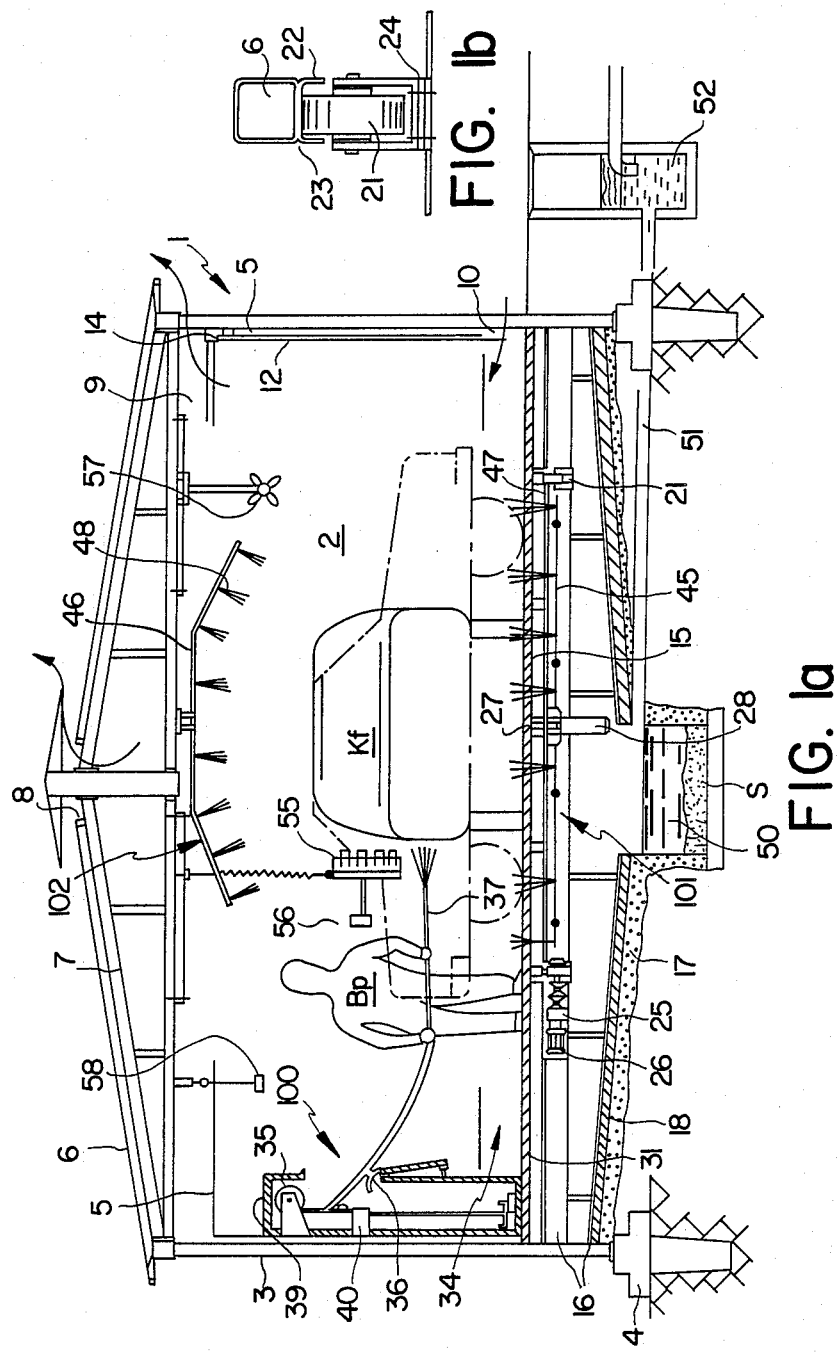
FIG. 1(a) shows a cross-section through an installation according to the invention along the shear surface A—A of FIG. 2, in which however the supporting framework and the operator's stand of the installation are shown in rotated manner with respect to their mutual position in FIG. 2.
Figure 2:
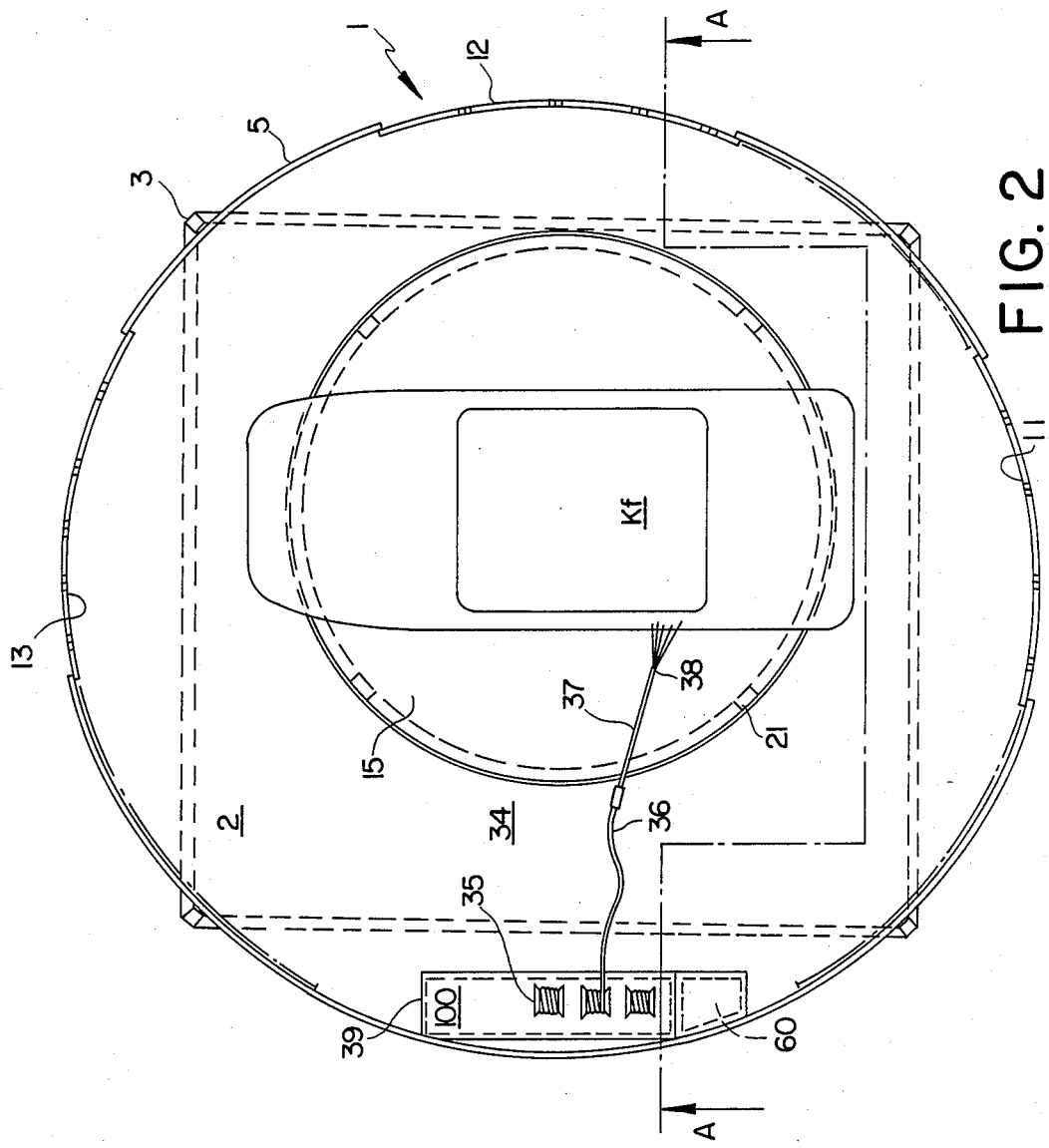
Figure 3:
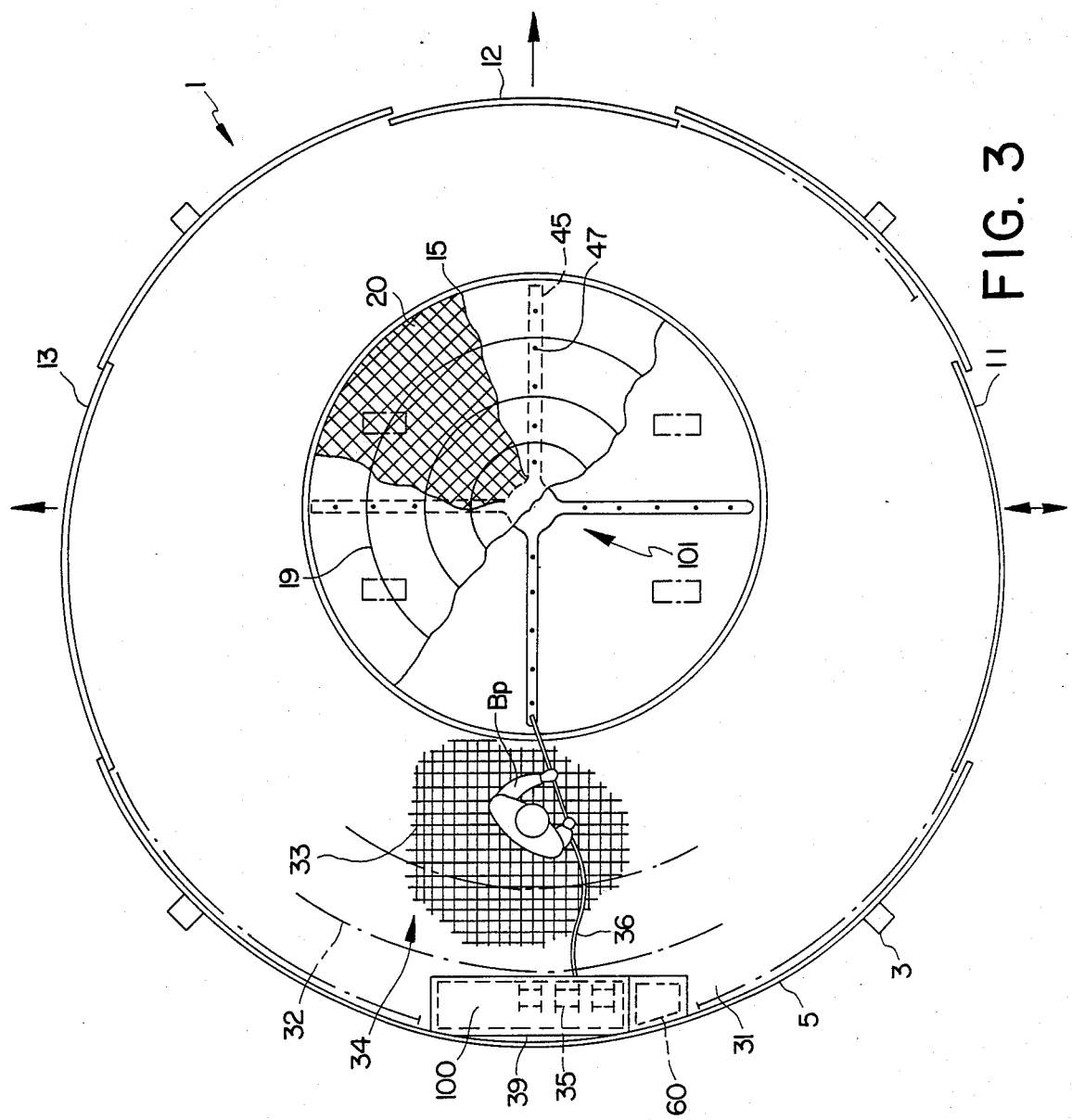
Figure 4:
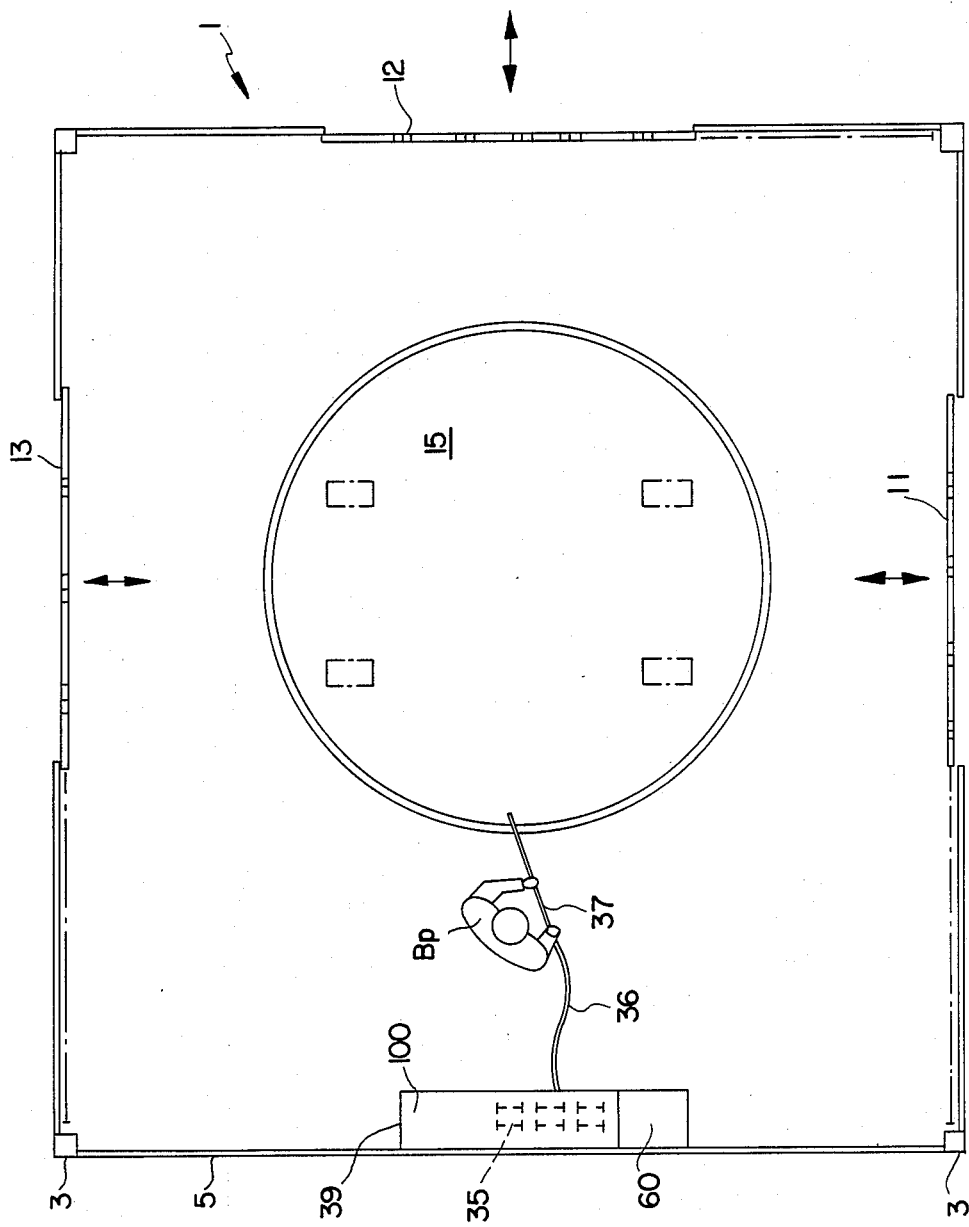
Figure 5:
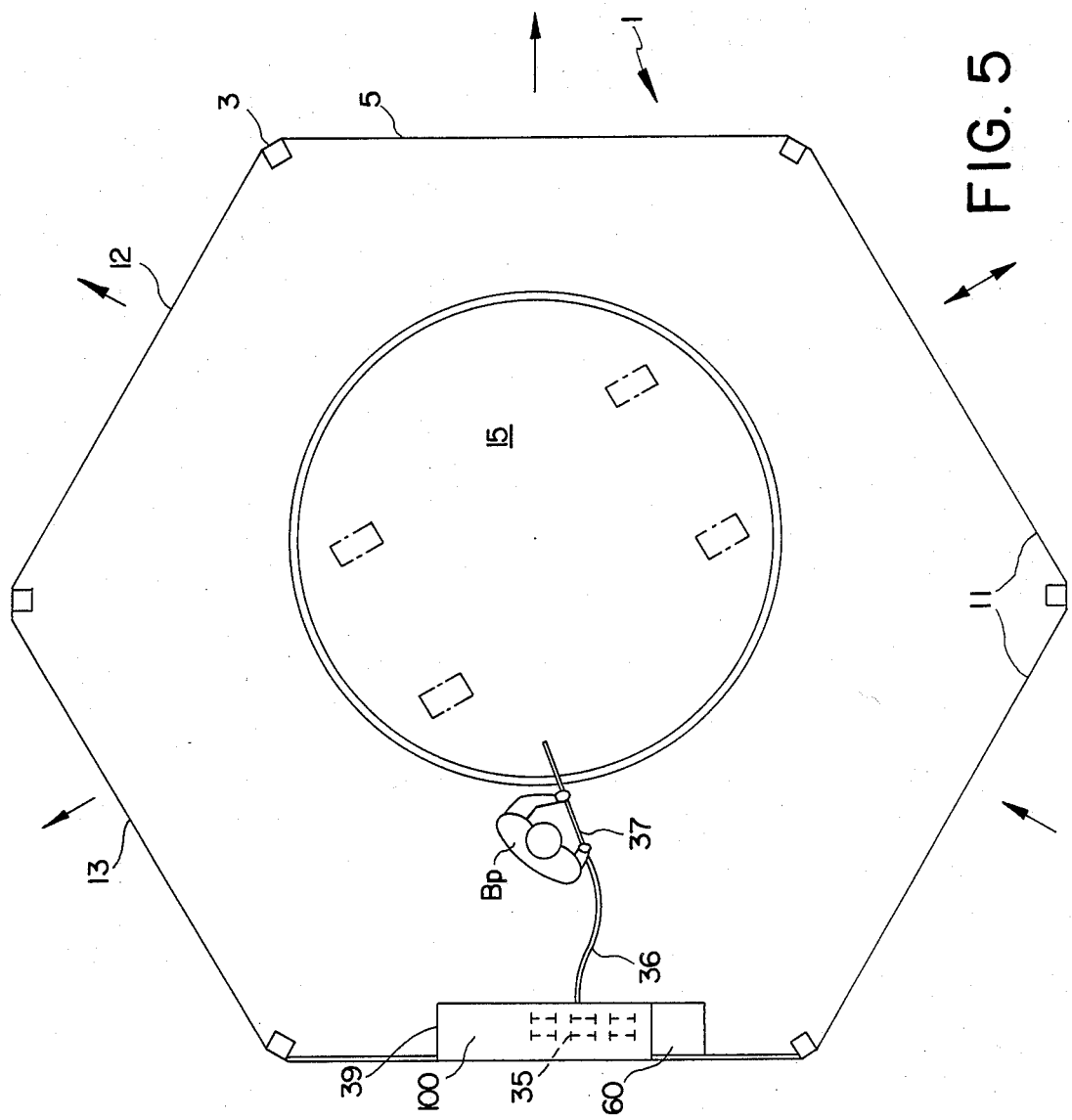

(b) shows a detail concerning the support of a rotatable platform for motor vehicles, according to the invention;

FIG. 2 shows a circular plan view of the installation according to FIG. 1 with supporting framework;

FIG. 3 shows the construction of a rotatable platform in the floor of the installation according to FIG. 2 and of the stationary floor region surrounding the platform, as well as a multi-appliance set which is also rotatable and disposed below the platform, with this Figure being shown in plan view;

FIG. 4 shows a schematic plan view of an installation according to the invention having a rectangular layout, this view additionally indicating in outline possible directions for driving in and out;

FIG. 5 shows a schematic plan view of a hexagonal installation according to the invention;

FIG. 6(a) shows a multiple installation comprising four circular treatment rooms according to the invention, with the directions for driving in and out being shown in outline;

(b) shows an installation as under (a), but comprising hexagonal treatment rooms; (c) shows an installation as under (a), but comprising four-square treatment rooms;

(d) shows a group of conventional washing boxes having a rectangular layout and a parallel passage direction of the vehicles to be treated, according to the known prior art; FIG. 7(a) shows a front view of the multi-appliance set of the operator's stand in a treatment room according to the invention, consisting of three short hoses in a protective covering, each hose being wound on a reel and each having at its free end a spraying lance and being connected at the other end to a feed pump; and (b) shows a side view of the multi-appliance set along with the protective covering according to FIG. 7(a).

The construction of an installation according to the invention is schematically illustrated in FIGS. 1a, b as well as 2 and 3. FIGS. 2 to 5 display layout configurations for the installation which are especially expedient with regard to smooth operation accompanied by economic ground utilization. Examples for suitable configurations of multi-installations on the basis of the invention can be taken from FIG. 6. Finally, FIG. 7 illustrates advantageous details with regard to the nature of the multi-appliance set on the operator's stand of such an installation which are rendered possible only by the use of a rotatable platform according to the invention.

The installation according to the invention, serving for the maintenance of motor vehicles Kf, consists of a housing 1 which can be erected relatively simply from pre-fabricated component parts in the manner of a pile house and which can be disassembled again and moved to a different location and which encloses a treatment room 2. The supporting framework of the housing 1 which is composed of metallic profile tubes 3 of preferably four-cornered cross-section is anchored to a number of steel posts 4 that are driven into the ground and whose number corresponds to the number of the vertical profile tubes 3. The supporting framework of the housing 1 is laterally cased with thin, curved or planar wall panels 5 of semitransparent plastics material and the treatment room 2 is covered by a mushroom-shaped roof 6 of the same material. The mushroom roof is supported by a roof framework 7 and has a central opening 8 for ventilation of the treatment room 2. For the same reason the wall panels 5 are dimensioned such that the lateral casing of the housing 1 leaves free an upper and a lower ventilation opening 9 and 10 each extending all around the housing. The entrance and exit doors 11, 12, 13 of the treatment room 2 consist of wall panels of the same nature which are slidably disposed on guide means 14. The location and the orientation of entrance and exit can be selected arbitrarily. In this manner, the installation can be adapted to the particular local conditions and requirements, respectively, for the purpose of optimum ground utilization. This applies in particular for the case of a multi-installation of several juxtaposed housings 1 of circular or polygonal layout.

For receiving the particular motor vehicle Kf to be treated, a rotatable platform 15 is disposed in the floor of the treatment room 2. The rotatable platform 15 and the stationary floor region surrounding it are carried by a specific floor framework 16 in which the rotatable platform 15 is supported with the aid of a central bearing or support 27 so as to be rotatable in, expediently excentric manner with respect to the geometrical center of the floor of the treatment room 2. Below the floor framework or structure 16 there is provided a floor insulation 18 in the form of a plastics foil or a sheet metal plate, which is preferably placed on a bed of sand 17. The protection against losses of heat as it is achievable thereby keeps the expenditure low which is necessary for heating the installation during winter. The rotatable platform 15 comprises, in particularly advantageous manner, a circular steel frame 19 which is composed of sectors and into which are inserted grid elements 20 which also consist of steel and are of sector-like configuration. This structure permits cleaning liquids to be sprayed from underneath through the platform 15 while the platform 15 nevertheless has a good carrying capacity, and this structure also permits simple replacement of grid elements 20 which are worn at most. Furthermore, the rotatable platform 15 is supported by rollers 21 along its circumference in the floor framework 16, said rollers abutting against the lower side of the platform 15 between an outer protective collar 22 and an inner protective collar 23 in the vicinity of the circumference, the support of the rollers 21 being each secured in the floor framework 16 via a height adjustment means 24 disposed below said rollers and composed of adjustment plates (cp. FIG. 1b). The two protective collars 22, 23 prevent the ingress of dirt between the running surfaces of the platform 15 and the rollers 21. The height adjustment means 24 permit horizontal fine adjustment of the platform plane For rotation of the platform 15, a drive 25 is provided outside of the platform circumference. The drive 25 is in operational connection with one of the rollers 21. However, it would also be conceivable to provide a central underfloor drive. An electric motor 26 with speed adjustment and reversal of the direction of rotation is provided as the prime mover of the drive for the rotatable platform 15. However, instead of the electric motor 26, a hydraulic motor controllable in the same manner could also be employed conveniently.

Furthermore, below the central bearing 27 of the rotatable platform 15 there is installed a vertical drive 28 in the form of a pressure cylinder. By means of the vertical drive 28, lifting of the rotatable platform 15, for instance for servicing, repair or replacement of the rollers 21, is rendered possible. Instead of the pressure cylinder, the use of a different vertical drive would of course be feasible as well.

As can be seen from FIGS. 2 and 3, the floor portions of the treatment room 2 around the rotatable platform 15 form a stationary floor grid 31 which, as seen in plan view, has the configuration of an unsymmetrical ring area. In a manner similar to the rotatable platform 15, the floor grid 31 also consists of a steel frame 32, which is also divided into sectors, and of grid elements 33 of corresponding configuration which are made of steel and insertable into the sectors (cp. especially FIG. 3). Both the rotatable platform 15 and the stationary floor grid 31 are provided with a heating means that is not shown in FIG. 1, so that the draining off cleaning liquids cannot freeze in the grid openings in winter.

In the broadest portion of the annular area of the floor grid 31, in which there is the largest distance between the motor vehicle Kf to be treated and the wall of the treatment room 2, there is provided an operator's stand 24. This stand is the major range of movement of an operator Bp. Since the operator, owing to the rotatable platform 15 according to the invention, does not have to walk around the motor vehicle Kf during the treatment, the hose length necessary for supplying a cleaning liquid to the motor vehicle Kf may be kept considerably shorter in contrast to that required in conventional installations. As a consequence of this fact, it becomes possible to provide one specific hose each for each particular cleaning liquid, by means of which several cleaning liquids of different nature can be supplied independently of each other and without the risk of mixing thereof. Thus, the wall thickness of each hose can be selected according to the load by the feed pressure p which remains the same and is intended for supplying always the same cleaning liquid, and the cross-section of the hose can be selected in accordance with the required feed quantity Q. It is also possible to employ feed pumps that are stepped in accordance with the feed pressures p and feed quantities Q required for the particular cleaning liquid. The relatively short hoses are easy to manipulate by hand and can be wound on reels so that a simple handy multi-arrangement is rendered possible. Such a multi-arrangement can be realized with relatively modest expenditure, requires little space, can be provided in frost-protected manner and does not require an expensive supply arrangement. Another important advantage of the multi-arrangement is that, along with the avoiding of mixing of different cleaning liquids, the initially elucidated increased consumption of such liquids as well as the increase in time caused thereby are eliminated.

Figure 7B:
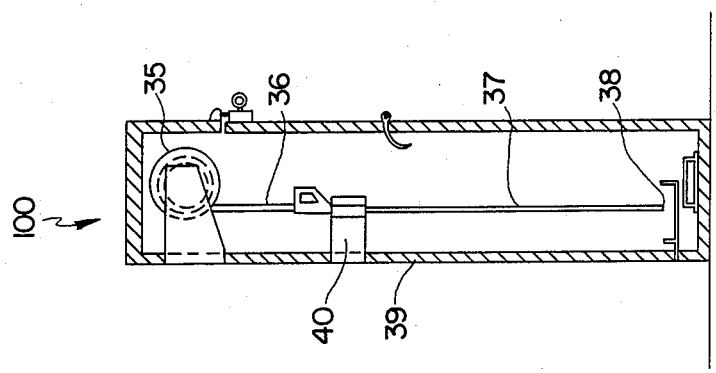
Figure 7A:
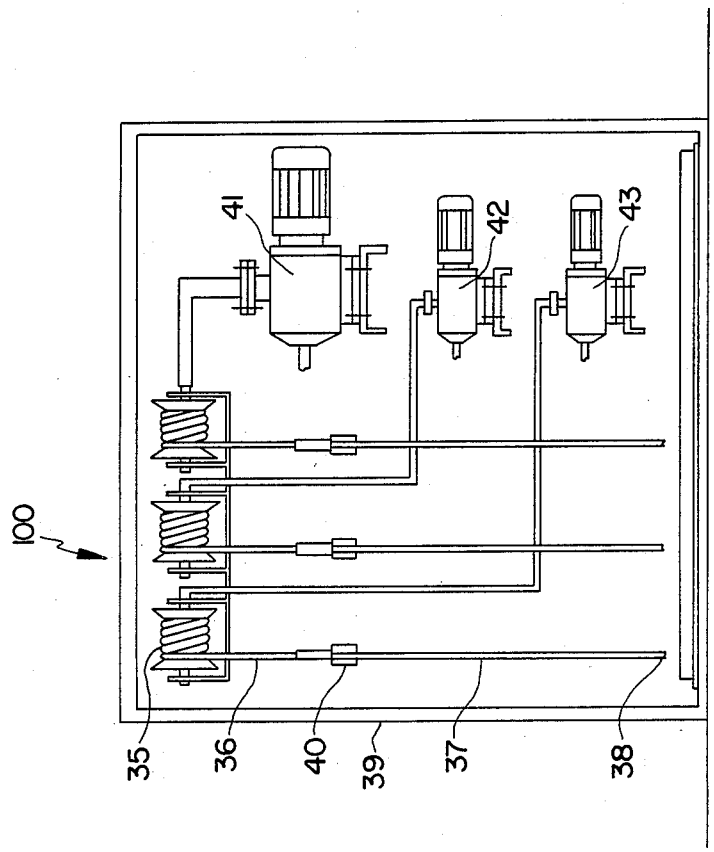

In the illustrated embodiment of the installation according to the invention, the operator's stand 34, as indicated in FIGS. 2 to 5 and especially in FIG. 7, includes a first multi-appliance set 100 comprising three hoses 36 which are each wound onto a reel or drum 35 and each have at their free end a spraying lance 37 together with a spraying nozzle 38. FIG. 7a shows a front view of the first multi-appliance set 100 disposed in a protective covering 39, with the front protective covering being removed, and FIG. 7b shows a side section thereof. The protective covering 39 is thermally insulated and heatable. In FIG. 7 all appliances are out of operation or use, the hoses 36 being wound completely onto their reels 35 and the spraying lances 37 being suspended in their supports 40. However, it would also be feasible to have thermally insulated and heatable sleeves provided on the outer surface of the protective covering 39 and each serving to receive a spraying lance 37 when this lance is deposited when not in use. Furthermore, FIG. 7a also shows three feed pumps 41, 42, 43 within the protective covering 39, each feeding a hose 36 with a specific cleaning liquid. The accommodation of the feed pumps 41, 42, 43 would also be possible at a different suitable location of the installation. The larger pump 41 which supplies cleaning liquid in the form of preferably preheated water for the main wash into the house 36 on the righthand side of FIG. 7a, is a high pressure pump with a pressure of at least 100 bar and has a variable feed capacity of 1000 to 4000 l/h. The lower feed capacity of 1000 l/h is designed for feeding the first multi-appliance set 100 and the higher feed capacity of up to 4000 l/h is designed for feeding additional appliance sets which still are to be described. The two smaller feed pumps 42, 43 of equal capacity each feed, into the respective hose 36 connected thereto, water for the pre-wash and/or super-foam and, respectively, water for rinsing and/or hot wax at a lower pressure of 20 bar and a feed capacity of 200 l/h. Underneath the rotatable platform 15 and, respectively, thereabove at the roof framework 7, there are disposed four pipe pieces 45 and 46, respectively, in cruciform arrangement each.

The pipe pieces 45 and 46, respectively, are each provided with a number of spraying nozzles 47 and 48, respectively, the spraying nozzles 47 on the pipe pieces 45 of the pipe cross disposed below the platform 15 being directed through the grid openings of the platform 15 against the underfloor of a motor vehicle Kf standing on said platform, and the spraying nozzles 48 on the pipe pieces 46 of the pipe cross attached to the roof framework 7 being directed against the roof of said motor vehicle Kf. The pipe cross consisting of the pipe pieces 45 and the associated spraying nozzles 47 forms a second multi-appliance set 101 underneath the rotatable platform 15, whereas the other pipe cross on the roof framework 7, composed of the pipe pieces 46 and the spraying nozzles 48 provided thereon, forms a third multi-appliance set 102.

Each of the pipe pieces 45 and 46, respectively, of the two multi-appliance sets 101, 102 is provided for a different cleaning liquid. The upper feed capacity range of the high pressure pump 41, which can be as high as 4000 l/h, is designed for feeding the second and the third multi-appliance set 101 and 102. Furthermore, the two multi-appliance sets 101, 102 are each rotatable or at least pivotable in the two directions of rotation by means of a drive which is not shown. The pipe pieces 46 on the roof framework 7 are curved downwardly as shown in the side view according to FIG. 1.

FIG. 1 shows, furthermore, a collecting basin 50 under the floor framework 16, which serves for contaminated cleaning liquids and from which a discharge channel 51 leads to an oil separator 52 known per se, which is also disposed below ground. The discharge of mud S from the collecting basin 50 is effected by means of an opening suitably formed in the rotatable platform 15 and not shown in FIG. 1, whereas the oil separator 52 is emptied in a manner known per se.

Cleaning of a motor vehicle Kf placed on the rotatable platform 15 can be carried out by means of the three multi-appliance sets 100, 101 and 102 under simultaneous rotation of the platform 15, at the same time from above, from the sides and from below with the assistance of one operator Bp only, and this cleaning process can be performed rapidly. Due to the fact that the treatment time of the vehicles to be treated in the installation according to the invention is considerably shorter in comparison with those of known installations, a significant increase in turnover and thus an improved profitability of the installation can be realized. The operator Bp no longer has to carry out the troublesome task of dragging around a long heavy hose.

For increasing the mechanical cleaning effect of the liquid jets from the three multi-appliance sets 100, 101, 102 for the removal of firmly adhering dirt from the vehicle body, there is provided a power-operated brush roll 55 having a substantially vertical axis of rotation and being disposed in multi-freedom, manually movable manner on corresponding guides 56 of the roof framework 7. A guide handle 57 attached to the brush roll 55 for manipulation thereof has hand-operated keys, not shown in FIG. 1, for controlling the brush roll drive which also is not shown. It is also possible to provide an additional power-operated brush roll having a substantially horizontal axis of rotation.

Owing to these measures, a combination of the advantages of an automatic washing installation with those of a manually operated self-service washing installation is rendered possible. Projecting parts and possible equipment parts of the motor vehicle Kf need not be removed any more for the treatment process.

All liquid-carrying apparatus, such as the feed pumps 41 to 43, the hoses 36, the spraying lances 37 as well as the pipe pieces 45, 46 along with the spraying nozzles 38, 47, 48 are provided with a self-regulating accompanying heating system of semi-conductive plastics heating bands which are not shown in the drawings for reasons of clarity. The elements such as the pump, the hose as well as the spraying lance with the spraying nozzle or the pipe piece together with the spraying nozzle, which belong to one particular set serving to supply always the same cleaning liquid are marked in the same color like that used for dying the cleaning liquid to be supplied. The outlined manner of antifreeze protection and, respectively, differentiation is rendered possible only by the multi-arrangement of separate hoses 36 and pipe pieces 45, 46, respectively, according to the invention.

Furthermore, two drying blowers 58 with adjustable blowing direction are provided on the roof framework 7 above the rotatable platform 15 in such a manner that they are suspended symmetrically with respect to a motor vehicle Kf disposed on said platform. Only one of the two drying blowers 58 is visible in FIG. 1.

The installation according to the invention, of course, comprises also a water heating system with electric or gas heating, which is not shown in the drawings and whose liquid container is equipped with immersible heating plates. As an alternative to this water heating system, a rotationally adjustable solar cell system could be provided on the mushroom roof 6 of the treatment room 2 and designed such that it follows the movement of the sun with the aid of an infrared sensor.

The control of the rotational, lifting and lowering motion of the rotatable platform 15 is effected with the aid of manual control apparatus 59 movably suspended from the framework 7. For adjustment of the feed pressure p and the feed quantity Q in the three hoses 36 of the first multi-appliance set 100, adjustment members not shown in the drawings are provided on the handle of each spraying lance 37. All adjustment quantities for the two other multi-appliance sets 101, 102, the water heating system and for the two drying blowers 58 are controllable from a central control desk 60 which is accommodated in the region of the first multi-appliance set 100 on the operator's stand 34. Finally, a loudspeaker system, not shown, is provided in the treatment room 2, preferably on the roof framework 7 thereof, which can be operated from a central head office for announcing operational information and, optionally, for advertising and entertainment music. Such a central head office is preferably provided in multi-installations according to FIGS. 6a, b and c. This audio control system, too, can be realized only because of the short distances which, in turn, result from the present invention.

In the light of the above explanations it will be noted that erection and operation of an installation according to the invention can be carried out rapidly and without technical problems and in an economically more favorable manner than with conventional self-service washing installations. Moreover, the installation according to the invention is also suited in excellent manner for check-up, servicing and mounting operations in the automobile business.

I claim:

1. An installation for wet-cleaning automobiles, comprising a roofed treatment room for automobiles, which includes self-service means for supplying cleaning liquids required for the treatment of the automobiles, wherein a rotatable platform for receiving the automobile to be treated is provided in the floor of the treatment room and wherein, on an operator's stand in the stationary floor region of the treatment room there is provided a multi-appliance set for supplying several cleaning liquids of different natures wherein each liquid can be supplied separately or in conjunction with any other liquid, said appliance being set to be manually operated, said first multi-appliance set being disposed on the operator's stand and including at least two hoses which can each be unwound from a reel and each serve for a different cleaning liquid, the outer end of each hose having a spraying lance connected thereto which is provided with a spraying nozzle on its free end, and a second multi-appliance set provided underneath the rotatable platform consisting of four pipe pieces disposed in cruciform arrangement and having a number of spraying nozzles directed against the under floor of the automobile.

2. An installation according to claim 1, wherein the support of the rotatable platform is provided eccentrically with respect to the geometrical center of the floor of the treatment room.

3. An installation according to claim 1, wherein the rotatable platform comprises a circular steel frame which is formed of sectors and into which are inserted grid elements which also consist of steel and have a sector-like configuration.

4. An installation according to claim 1, wherein the rotatable platform is supported on rollers abutting against the lower side of the platform between an outer protective collar and an inner protective collar in the vicinity of the circumference, the support of the rollers being each secured in the floor framework of the platform via a height adjustment means.

5. An installation according to claim 1, further comprising a drive acting on one of the rollers being provided for actuation of the rotatable platform.

6. An installation according to claim 1, further comprising a central underfloor drive being provided for actuation of the rotatable platform.

7. An installation according to claim 6, wherein the prime mover of the drive is an electric motor or a hydraulic motor.

8. An installation according to claim 6, wherein the direction of rotation and the speed of the drive are adjustable.

9. An installation according to claim 1, wherein the rotatable platform has a vertical drive associated therewith, by means of which it is liftable and lowerable.

10. An installation according to claim 1, wherein the floor regions of the treatment room surrounding the rotatable platform form a stationary floor grid that consists of a steel frame divided into sectors, and of grid elements inserted into the sectors.

11. An installation according to claim 10, wherein the rotatable platform and the stationary floor grid surrounding it are each provided with a heating means.

12. An installation according to claim 10, wherein the operator's stand is provided on the stationary floor grid of the treatment room in the portion of said room having the largest distance between the automobile to be treated and the wall of the treatment room.

13. An installation according to claim 1, wherein short hoses are provided each having a wall thickness that is adapted to a particular feed pressure serving for always supplying the same cleaning liquid, and said hoses and drums, respectively, are manually operable.

14. An installation according to claim 1, wherein the first multi-appliance set is mounted on the operator's stand in a thermally insulated and heatable protective covering having on its outer surface thermally insulated and heatable sleeves each serving to receive a spraying lance when said lance is deposited when not in use.

15. An installation according to claim 1, further comprising a third multi-appliance set provided above the rotatable platform on the floor framework consisting of four pipe pieces disposed in cruciform arrangement and each serving for a different cleaning liquid and each having a number of spraying nozzles directed against the roof of the automobile.

16. An installation according to claim 1, wherein the second one and the third one of the three multi-appliance sets are disposed to be rotatable or at least pivotable in two directions of rotation.

17. An installation according to claim 1, further comprising a power-operated brush roll having a substantially vertical axis of rotation and a second such roll having a substantially horizontal axis of rotation are disposed in multi-freedom, manually movable manner on corresponding guides of the roof framework.

18. An installation according to claim 1, wherein the supply unit supplying the feed pressures for feeding the cleaning liquids comprises a high pressure pump having a pressure of at least 100 bar and a variable feed capacity of 1000 to 4000 l/h, as well as two identical low pressure pumps each having a pressure of 20 bar and a feed capacity of 200 l/h.

19. An installation according to claim 1, wherein the supply unit also comprises a water heating system with electric or gas heating.

20. An installation according to claim 1, further comprising a rotationally adjustable solar cell system provided on the roof of the treatment room and designed to follow the movement of the sun by means of an infrared sensor.

21. An installation according to claim 1, wherein all liquid-carrying apparatus, such as the pumps, hoses and spraying lances as well as pipe pieces together with the spraying nozzles, are provided with a self-regulating accompanying heating system of semi-conductive plastics heating bands, and the liquid containers of the supply unit are provided with immersible heating plates.

22. An installation according to claim 1, further comprising two drying blowers with adjustable blowing direction being provided on the floor framework of the treatment room above the rotatable platform.

23. An installation according to claim 1, further comprising entrance and exit doors of the treatment room being formed by curved or planar wall panels that are slidably disposed on guide means, the location and the orientation of entrance and exit being selectable arbitrarily and, thus, being adaptable to the particular local conditions and requirements, respectively, in particular in the case of a group of several housings of preferably circular layout that are erected directly next to each other.

24. An installation according to claim 1, further comprising a floor insulation in the form of a plastics foil or a sheet metal plate being disposed in the treatment room below the floor framework of the rotatable platform and the stationary floor grid surrounding said platform.

25. An installation according to claim 15, further comprising a manual control apparatus movable suspended on the roof framework being provided for controlling the rotational, lifting and lowering motions of the rotatable platform and push-button keys disposed on the guide handle of each power-operated brush roll being provided for controllably driving said brush rolls, and adjustment members disposed on the handle of each spraying lance being provided for adjustment of the feed pressure and the feed quantity in the hoses of the first multi-appliance set while all adjustment quantities for the tow other multi-appliance sets the water heating system and the two drying blowers are controllable from a central control desk in the operator's stand.

26. An installation according to claim 1, wherein the different cleaning liquids together with the particular spraying set, such as hose, spraying lance or straight pipe piece with spraying nozzle, which serves for supplying the particular cleaning liquid to the automobile to be treated, are each marked in a different color.

27. An installation according to claim 1, further comprising a loudspeaker system for announcing operational information, for advertising and entertainment music, being disposed in the treatment room, preferably on the roof framework thereof, said loudspeaker system being operable from a central head office.

28. An installation according to claim 1, wherein the housing enclosing the treatment room is erected from prefabricated elements in the manner of a pile house having a circular or a polygonal layout the supporting framework of said housing consisting of tubes being cased with thin wall panels.

* * * * *